United States Patent [19]

Schatzki

[11] Patent Number: 4,539,648
[45] Date of Patent: Sep. 3, 1985

[54] DETECTION OF AGRICULTURAL CONTRABAND IN BAGGAGE

[75] Inventor: Thomas F. Schatzki, Berkeley, Calif.

[73] Assignee: The United States of America as represented by the Secretary of Agriculture, Washington, D.C.

[21] Appl. No.: 426,440

[22] Filed: Sep. 29, 1982

[51] Int. Cl.³ .................... G01N 23/00; H04N 5/20
[52] U.S. Cl. ................... 364/555; 250/358.1; 358/111; 378/11; 378/57; 378/70; 378/99
[58] Field of Search .............. 364/555; 358/111, 140, 358/164; 250/358.1, 330, 363 R, 492.1; 378/4, 11, 21, 57, 70, 82, 99

[56] References Cited

U.S. PATENT DOCUMENTS

| 3,808,444 | 4/1974 | Schneeberger et al. | 250/492 |
|---|---|---|---|
| 3,919,467 | 11/1975 | Peugeot | 378/99 |
| 3,964,021 | 6/1976 | Tamches | 382/55 |
| 4,031,545 | 6/1977 | Stein et al. | 378/57 |
| 4,047,035 | 9/1977 | Dennhoven et al. | 250/355 |
| 4,064,440 | 12/1977 | Roder | 378/57 |
| 4,139,771 | 2/1979 | Dennhoven et al. | 378/99 |
| 4,239,969 | 12/1980 | Haas et al. | 250/359 |
| 4,249,208 | 2/1981 | Haenen et al. | 358/164 |
| 4,259,721 | 3/1981 | Kuznia | 358/111 |
| 4,366,382 | 12/1982 | Kotowski | 378/99 |
| 4,385,634 | 5/1983 | Bowen | 128/659 |

OTHER PUBLICATIONS

"Linescan System One" by Scanray Corporation (Described in U.S. patent application Ser. No. 185,561).

Primary Examiner—Felix D. Gruber
Assistant Examiner—Heather R. Herndon
Attorney, Agent, or Firm—M. Howard Silverstein; David G. McConnell; Margaret A. Connor

[57] ABSTRACT

A radiant energy imaging system for selectively enhancing the image of objects having circular cross section to distinguish them from the image of objects having rectangular cross section, such objects being contained in a material having a different density-absorption coefficient product than the objects. In the invention, the gradient image of the spatially resolved transmitted intensity of the radiation is calculated and eroded to preferentially remove the edges of images of objects having rectangular cross section. The invention finds particular use in detecting agricultural contraband contained in baggage or parcels.

19 Claims, 6 Drawing Figures

| | | | |
|---|---|---|---|
| 2.1 | X-RAY |  |  |
| 2.2 | OBJECT |  |  |
| 2.3 | $P \uparrow \rightarrow Y$ |  |  |
| 2.4 | $\lvert dp/dy \rvert = G$ |  |  |
| 2.5 | EROSION OF G |  |  |
| 2.6 | TRESHOLDING |  |  |
| | | A | B |

DETECTION OF AGRICULTURAL CONTRABAND IN BAGGAGE

BACKGROUND OF THE INVENTION

This invention relates in general to radiant energy imaging systems and more particularly, to a novel method and apparatus for selectively enhancing the image of objects or voids having circular cross section, such as agricultural and like-shape objects of voids, to distinguish them from objects or voids having rectangular cross section (manufactured objects or cracks).

A common method of dissemination of plant or animal disease vectors or pests such as the Mediterranean fruit fly to areas not yet infested is by the transport of agricultural items such as infected fruit, vegetables, plants, packaged meats and birds. In particular airline travelers pose a hazard in that large distances are rapidly traversed promoting the introduction of a pest into a region devoid of its natural enemies. Such dissemination can have serious economic impact on agricultural production. Currently, the primary methods for detecting agricultural contraband in passenger baggage are by passenger questioning, and manual baggage search. Such methods are unreliable and time consuming.

In a few locations, X-ray imaging systems used for inspection of passenger baggage for security reasons and digital X-ray scanners have been introduced to inspect baggage for agricultural contraband. These methods have the disadvantage that they rely on the ability of a human operator to recognize contraband items objects solely on the basis of shadow shape and density. Thus while agricultural objects such as pineapples, pears and papayas which have distinctive shapes, can be readily distinguished from manufactured objects, other agricultural contraband such as tangerines, apples, mangos, sausages and the like which have image shapes similar to non-contraband objects cannot be readily detected. Furthermore, even in those cases where it is possible to distinguish images of agricultural objects by their shape, such an inspection requires intense operator effort resulting in operator fatigue. Furthermore, such a procedure is time-consuming. This is a disadvantage for to be successful in a commercial setting, the monitoring system must monitor a piece of luggage in about 2-4 seconds.

U.S. Pat. No. 3,808,444 discloses an automatic high energy X-ray monitoring system for detecting dense metallic objects such as guns or bullets in baggage. Objects in the density range of agricultural objects are not detected by this method.

In medical studies, X-ray imaging is commonly used to image internal organs or other objects contained in human or animal bodies. A single X-ray projection minimizes the dose and apparatus cost but does not allow depiction of the cross sectional shape of the imaged organ. Such shape information is desirable but can generally only be obtained through multiple angled exposures and reconstruction (tomography), which is expensive and exposes the patient to undesirable radiation doses. Alternatively, a very extensive analysis of the density of a single exposure is time consuming and difficult.

In industrial inspection of materials for cracks and voids X-rays are the method of choice. Single exposures are used for speed and economy, but the image does not reveal the cross sectional shape of the cracks and voids, nor does it allow automatic recognition and counting of such cross sectional shapes which are desired for quality control.

SUMMARY OF THE INVENTION

I have discovered a novel method and apparatus using a computerized radiant energy imaging system to rapidly and easily distinguish images of objects having circular cross section such as agricultural and like-shape objects from objects having rectangular cross section such as manufactured objects, the objects being contained in a material having a different density-absorption coefficient product. Since a void has a different density-absorption coefficient product from the material in which it is present, the term void is included within the term objects and the method and apparatus may be used in the same way for voids as for objects.

The method of the invention to distinguish objects having circular cross section from objects having rectangular cross section comprises directing a beam of radiant energy through the objects, measuring the spatially resolved transmitted intensity of the radiation, calculating the gradient image of the spatially resolved transmitted intensity, eroding the gradient image one or more times to preferentially remove the edges of images of objects having rectangular cross section relative to the edges of images of objects having circular cross section and presenting the image. The apparatus of the invention comprises means for practicing the above method.

One important advantage of the invention is the provision of a means for rapidly and easily detecting agricultural contraband in baggage and parcels and/or automatic activation of an alarm if the amount of contraband exceeds a set value. Use of the invention enables an operator to visually detect such contraband without undue strain or fatigue and in the 2-4 seconds time allotment required for optimal commercial operation. Alternately, or in addition, the alarm system can automatically alert an operator to the presence of contraband.

Another advantage of the invention is the prevention of agricultural losses and spread of disease due to the prevention of dissemination of plant or animal disease vectors or pests contained in agricultural or biological commodities.

Another advantage of the invention is that it allows three-dimensional shape information of organs and objects contained or embedded in human and animal bodies from a single X-ray exposure.

Another advantage of the invention is that it allows rapid and automatic recognition of circular voids in the presence of cracks during industrial inspection of materials by X-ray.

Further objects and advantages of the invention will be evident from the following description.

DESCRIPTION OF THE PREFERRED EMBODIMENTS

Figure 1:
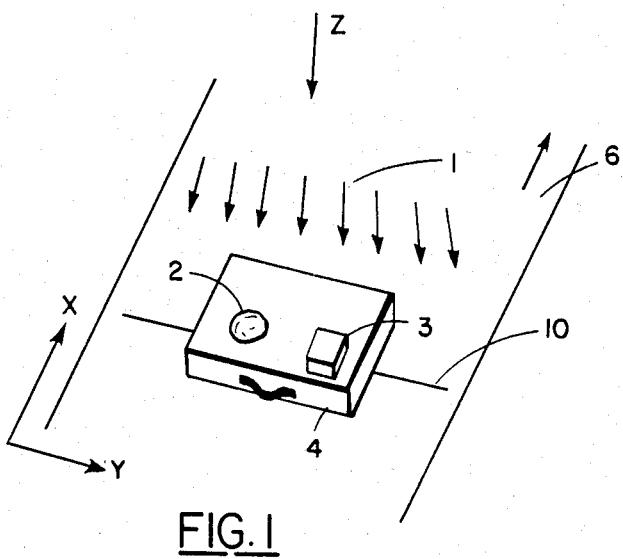
FIG. 1 is a pictorial representation of a conventional method of measuring the spatially resolved transmitted intensity of objects contained in a piece of baggage.

My method and apparatus to detect agricultural contraband and objects of like-shape are based on three-dimensional shape, particularly the cross section of an object and presence or absence of sharp (step) edges. Because of biological growth or method of preparation, agricultural objects are either ellipsoidal in shape (for example, most fruits and vegetables and other biological objects such as birds) or long cylinders (for example, bananas, sausages and plant cuttings). When imaged by a radiant energy source, these agricultural objects have rounded (circular) cross sections. In contrast, manufactured objects, particularly those in the same density range as agricultural objects, are rarely ellipsoidal and tend to be either rectangular in shape; or cylinders (particularly short cylinders such as cold cream jars, and deodorant sticks); or to have distinctive shapes (for example shoes, electric razor, and coat hangers). Because short cylinders are generally packed or shipped straight up, manufactured objects—when imaged by a radiant energy source—have a rectangular cross section and sharp (step) edges, or, if rounded, exhibit distinctive overall shape. Other manufactured objects such as bullets or guns are readily detected in such imaging systems by their density and distinctive shape.

In the method of the invention, objects having circular cross section such as agricultural contraband are selectively enhanced at the edges while objects having rectangular cross section are not so-enhanced. The enhanced edge image is then directly displayed to an operator or added to the original image, that is, the image obtained by the conventional use of a radiant energy imaging system as described in further detail below, to present the operator with an image wherein objects having circular cross section are selectively highlighted. Alternately, the enhanced edge image is summed and set to activate an alarm if a certain level of agricultural and like-shape objects (objects having circular cross section) are detected. In another alternate embodiment, the enhanced edge image ia further enhanced by changing it to another color (false color transform) and/or by multiplying it by a constant to increase the intensity prior to being displayed or added to the original image.

The steps of the method of the invention are as follows: first, a beam of radiant energy such as an X-ray beam, ultrasonic radiation or nuclear radiation is directed through the objects to be distinguished, for example agricultural contraband contained in passenger baggage or parcels. The radiant energy beam passes through the objects and is attentuated by them, that is, the intensity of the radiation is decreased by each object depending on its thickness, absorption coefficient and density. In the case of a void or other region of lesser density-absorption coefficient product, the attenuation of the radiation is diminished, and hence the transmitted radiation increased in like amount as by an object of corresponding greater density-absorption coefficient. Next, a detector located behind the objects and facing the radiation source measures the spatially resolved transmitted intensity of the radiation and a digital image is constructed.

Referring to FIG. 1, a convenient way to measure the spatially resolved transmitted intensity is to place baggage 4 on moving belt 6 in the xy plane, moving in the x-direction as shown. Using flat X-ray beam 1 essentially in the z-direction, baggage 4 containing objects 2 and 3 is detected by detector 10 shown in FIG. 1 as a linear array aligned in the y-direction and an image f(x,y) constructed. Other methods of imaging can be used such as a pencil beam scanning the object with motion by the object and/or the beam, a conical beam and a two-dimensional detector array or an X-ray phosphor with video camera. Such radiation and detection devices are well known in the art and are commercially available. Any radiant energy source may be used which is attenuated by the objects such that the transmitted intensity (i.e. the intensity received by the detector) is a function of the material transversed. An X-ray beam is the energy source of choice. It is preferred that the beam of radiant energy pass through the object substantially in the z-direction as shown in FIG. 1. Next, the image f(x,y) is optionally fully or partially gamma corrected (subjected to a logarithmic transformation) resulting in an image whose change of intensity is approximately proportional to the amount of material transversed. Conventionally, when imaging absorbing objects, a black/white reversal is applied, but is not necessary to the practice of the invention. In the following discussion, the transformed image is referred to as the original image p(x,y).

Figure 2:
FIG. 2 is a pictorial representation of the steps of the method of the invention depicted as a section at constant x through FIG. 1.
Figure 2:
Figure 2:
Figure 2:
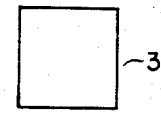
Figure 2:
Figure 2:
Figure 2:
Figure 2:
Figure 2:
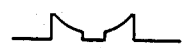
Figure 2:
Figure 2:
Figure 2:

FIG. 2 depicts a section at constant x through FIG. 1 to illustrate the basis of the method of enhancement. In FIGS. 2.1 and 2.2 the vertical coordinate is $-z$, while in FIGS. 2.3–2.6 the vertical coordinate is the image intensity. The horizontal coordinate in FIG. 2 is always y, while the direction of x is into the paper. The original image p(y) is shown in FIG. 2.3. Because object 2 having circular cross section and object 3 having rectangular cross section are depicted as having the same maximum thickness, the maximum value of p(y) is the same for each; however the intensity of object 2 shows a lightening at the edges whereas the intensity of object 3 shows a sharp (step) edge.

In the next step, the gradient image, that is, the absolute value of the rate of change of the intensity, $|\nabla p| = g$, is calculated pixel by pixel. In one dimension, $\nabla p = dp/dy$ (FIG. 2.4). Since the two objects have the same maximum thickness, the integral under curves FIG. 2.4 are equal but the gradient image of object 3 is restricted to sharp narrow regions whereas the gradient image of object 2 shows broad sloping regions. If object 3 having rectangular cross section is slightly tilted or if the beam is slightly tilted from the z-direction, as will occur if the X-ray source in FIG. 1 is close to the object, the gradient edge of object 3 in FIG. 2.4 will spread somewhat, but will still be much narrower than that of object 2.

Next, the gradient image is eroded one or more times. One erosion cycle is as follows: for a given pixel, n adjacent pixels, where n is typically 4 or 8 and preferably 8, are considered. If at least m of the n adjacent pixels have an absolute gradient value less than a tolerance level, t, then the absolute gradient value of the central pixel is set equal to zero. If not, it is left unchanged (FIG. 2.5). Typically, the value of m is 3 and the value of t is 2½ percent of the maximum value of p in the image. The optimum number of erosion cycles is that which erodes the gradient image of an object having rectangular cross section completely or almost completely as shown in FIG. 2.5B while allowing at a least a portion of the eroded gradient (enhanced edge) image of an object having circular cross section to remain as shown in FIG. 2.5A. This number depends primarily on the size of the smallest object having circular cross section which one wishes to detect, the width of the gradient image of the objects which one wants to set to zero—those objects with step edges as shown in FIG. 2.3B and those objects having confounding edges which are almost, but not quite step edges (e.g., rectangular objects which are slightly tilted with regard to the radiant energy beam). Where it is desired that objects having circular cross section such as small grapes (7 pixels, 1.5 mm per pixel) be detected two erosion cycles are preferred. Where the smallest object to be detected is typically hand fruit (e.g., tangerines) five cycles could be used.

If desired, thresholding can be applied to the gradient image before or after erosion to yield the binary image, FIG. 2.6. To additionally enhance the edges remaining after erosion, the eroded gradient image with or without thresholding can be transformed such as by changing it to another color (false color transform) and/or by multiplying the intensity by a constant.

The images obtained by the above method are next presented in one or more of the following ways to alert an operator to the presence of objects having circular cross section such as agricultural contraband. In one method, the eroded gradient image, that is, the image wherein the edges of objects having circular cross section are present and step edges are eroded away, is presented directly to the operator, with or without additional enhancement. Alternatively, the eroded gradient image with or without additional enhancement is added to the original image of spatially resolved transmitted intensity so that the operator views an image of the objects wherein the objects having circular cross section have edges of heightened (highlighted) intensity. In this way, fruit, vegetables, and the like or voids can be readily visually detected by shape, highlighted edges and shadow density. Alternatively, or in addition, the eroded gradient image with or without thresholding is integrated over a portion or all of the image to yield a measure of total edge of objects of circular cross section to activate an alarm if the amount detected exceeds a set value, i.e., that value which indicates that contraband or excessive voids may be present.

Figure 3:
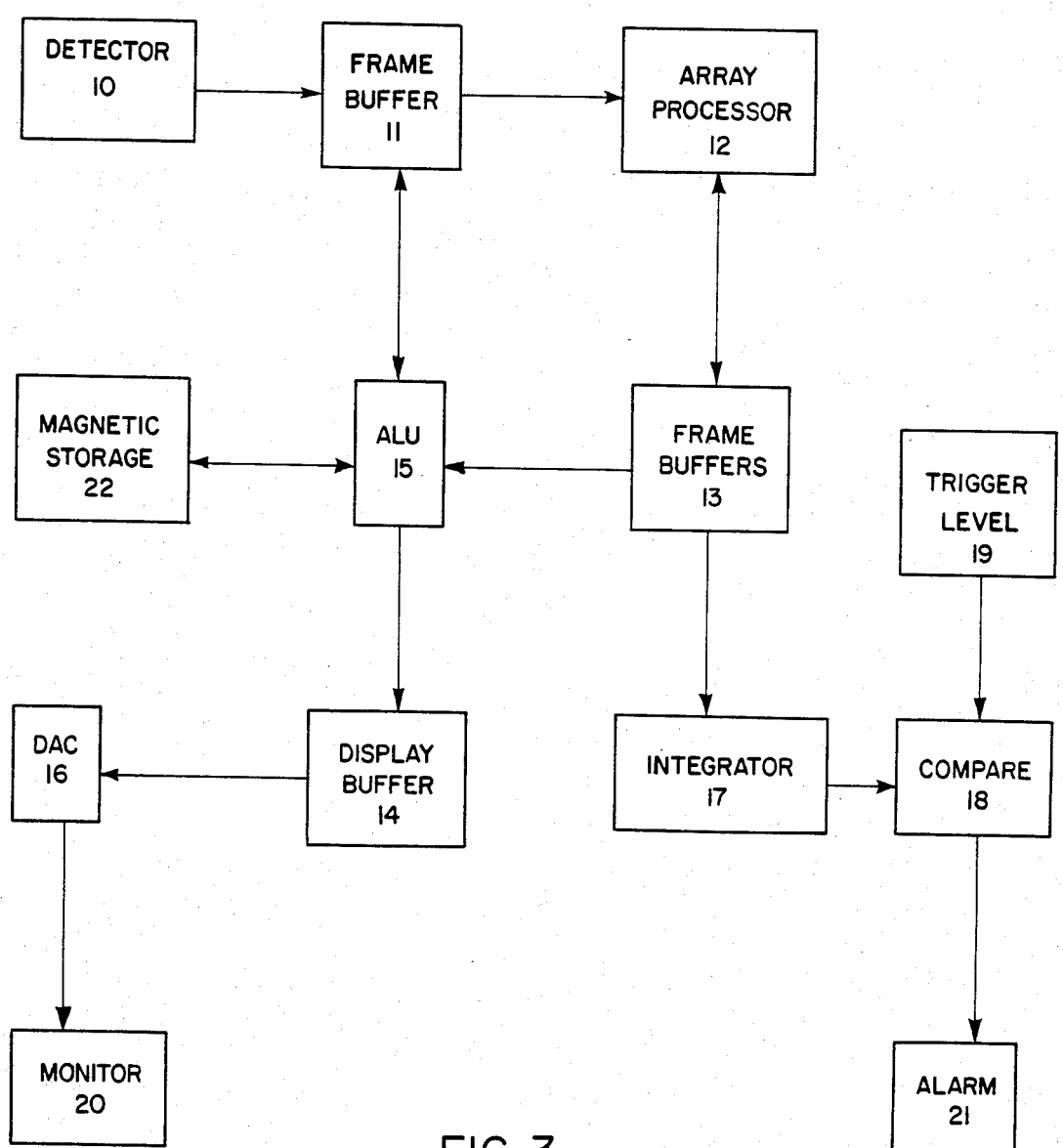
FIG. 3 is a block diagram illustrating the invention.

A block diagram illustrating the method and apparatus of the invention is given in FIG. 3. A digital spatial representation f(x,y) where x and y are the coordinates of the image of transmitted intensity on the image plane is received at detector 10. The image, with or without black/white reversal or gamma correction, is placed in frame buffer memory 11 in real time. The gradient of the image is computed and eroded as described in detail below. If this computation is done in real time, in the order of about 1 second, it is convenient to use array processor 12 and several frame buffers 13.

Once the eroded gradient image is created in frame buffers 13, it may be presented in one or more of the following ways. It may be sent to display buffer 14 by passing directly through arithmetic logical unit ALU 15 and after display formatting in digital-to-analog converter (DAC) 16 displayed on monitor 20 for viewing. Alternatively, the eroded gradient image may be increased in intensity or changed to another color in ALU 15 prior to displaying it. In another embodiment of the invention, the eroded gradient image in frame buffers 13, with or without increasing the intensity or changing to another color in ALU 15 may be added to the original image in frame buffer 11 using ALU 15, sent to display buffer 14, display formatted in DAC 16 and displayed on monitor 20 for viewing. Alternatively, or in addition, the enhanced edge image in 13 may be integrated over a portion or all of the image using integrator 17, and after comparison using comparator 18 with a trigger level contained in trigger register 19, set to activate alarm 21 if the trigger level is exceeded. Alternatively, the image in frame buffer 11 and/or the eroded gradient image or image with added eroded gradient image can be stored in a machine readable magnetic storage device 22 for later display, analysis or survey. All of the components depicted in FIG. 3 are individually available commercially. If 12 is an image array processor, the components 11-19 are commonly assembled as an image analysis system with frame buffers serving as units 11, 13 and 14. Alternatively, a generalized computer or floating point array processor can be used in place of units 11-13,15 and 17-19.

The instant invention provides a method of computations for the feedback loop of array processor 12 and frame buffer 13 in which the gradient is calculated and then eroded. Calculation of the gradient image can be performed by several methods such as the Prewitt gradient or the Sobel gradient. I have found the Prewitt gradient convenient which arises from fitting a plane to a 3×3 neighborhood of each pixel. If x,y are the position indices of the pixel, the computation using the Prewitt gradient is as follows:

$$g_1(x,y) = [-f(x-1,y-1) - f(x-1,y) - f(x-1,y+1) + f(x+1,y-1) + f(x+1,y) + f(x+1,y+1)]$$

and $$g_2(x,y) = [-f(x-1,y-1) - f(x,y-1) - f(x+1,y-1) + f(x-1,y+1) + f(x,y+1) + f(x+1,y+1)]$$

from which the gradient g is found as $$g(x,y) = [g_1^2(x,y) + g_2^2(x,y)]^{\frac{1}{2}}$$

A number of erosion algorithms exist. I have found the following algorithm convenient to use:

$$h_i(x,y) = 0 \text{ if } h_{i-1}(x',y') < t \text{ for at least } m \text{ pixels } (x',y')$$
$$= h_{i-1}(x,y) \text{ otherwise}$$

Here $(x',y')$ ranges over the 8 pixels adjacent to $(x,y)$ but not $(x,y)$ itself, while $m=3$. The algorithm is recursive, the subscript on h indicating the erosion cycles, and image $h_o = g$ (gradient image). I have typically used $h_2$ for the enhanced edge image, but $h_1$ or $h_3$ or greater may be used; use of $h_1$ instead of $h_2$ would enhance smaller objects but cause some false positives (i.e. enhancement of edges of objects not having circular cross section). Four instead of 8 adjacent pixels and other values of m, such as 2, can be used. It is also within the compass of the invention that an operator be given a switch to select $h_1$, $h_2$ or $h_3$, or other $h_i$ as desired. The constant t will depend on the amount of contrast in the image. It can be set by histogramming an image or histogramming the neighborhood of $h_{i-1}(x,y)$ using the image analysis system. For passenger baggage I have found the value $t = 0.025$ max p convenient.

Addition of the eroded gradient image to the original image f or p in frame buffer 11 is given by $b(f + ah_i)$ or $b(p+ah_i)$ where i is chosen as above, a is a multiplier and/or false color transform and b is a normalization constant. The constants are chosen to obtain the desired appearance on the monitor. It has been found convenient to use $a=b=1$ and p.

The following listing of a computer program written in BASIC language for a Tektronix 4052 computer implements a typical embodiment of the invention that was described above. The main program link, statements 1-4400 remains in memory at all times; overlays are stored on files 6,7, and 8 and begin at statement 10000. Different algorithm steps are brought in by User Keys. Depressing User Key n transfers control to statement 4n. Arrays F1, F2, F3, and F4, are 32×32 frame buffers. These buffers are small in this prototype because of memory limitations. Gradient calculation starts at statement 950; F2→F3, F4. Erosion calculation starts at statement 3290; F2→F2. Image display in simulated gray scale is on file 7. Image input is on file 6.

FILE #4

```
1   GO TO 750
4   GOSUB 100
5   GOSUB 750
7   RETURN
8   W$="FIGURE INPUT FILE 5A"
9   GOSUB 4330
11  RETURN
12  W$="FIGURE LIST/EDIT FILE 5B"
13  GOSUB 4330
15  RETURN
16  GOSUB 3230
17  GOSUB 750
19  RETURN
20  GOSUB 2470
21  GOSUB 750
23  RETURN
24  F2=F1
25  G2=G1
26  A$="MASTER ARRAY"
27  GO TO 2300
28  GOSUB 2310
31  RETURN
32  F2=F3
33  G2=G3
34  A$="OUTPUT F3: "&B$
35  GO TO 2300
36  F2=F4
37  G2=G4
38  A$="OUTPUT F4: "&C$
39  GO TO 2300
40  GOSUB 750
41  RETURN
44  GOSUB 1030
47  RETURN
48  GOSUB 2860
51  RETURN
52  GOSUB 3290
55  RETURN
56  RETURN
59  RETURN
60  W$="OUTPUT DISPLAY ARRAY TO PRINTER. FILE #8"
61  GOSUB 4330
62  RETURN
63  RETURN
64  GOSUB 2530
65  GOSUB 750
67  RETURN
68  W$="DISPLAY ARRAY DENSITY. FILE #7"
69  GOSUB 4330
71  RETURN
72  W$="INPUT IMAGE FROM TAPE. FILE #6"
73  GOSUB 4330
75  RETURN
```

```
76 GOSUB 3930
77 RETURN
100 REM INTERACTIVE IMAGE ANALYSIS, BY ARIE GROSSMAN 1982.
110 REM   470 REM CLEAR ARRAYS AND RESET ARRAY PARAMETERS
120 REM   740 REM PRINT USER KEY INDEX
130 REM   950 REM CLACULATE GRADIENTS
140 REM   960 REM  H: array of coefficients
150 REM   970 REM H0: diagonal gradient coefficients
160 REM   980 REM H2: array sums
170 REM   990 REM H3: temporary variable
180 REM  1000 REM H5: gradient magnitude
190 REM  1010 REM H6: gradient angles
200 REM  1020 REM H7: gradient display length multiplier
210 REM  1050 REM CLEAR GRADIENT MAGNITUDE ARRAY AND ANGLES ARRAY
220 REM  1450 REM 3/4 = ASPECT RATIO
230 REM  1570 REM COMPUTE GRADIENT ANGLES
240 REM  1760 REM DRAW GRADIENTS
250 REM  1940 REM DRAW SCREEN GRID
260 REM  2190 REM PRINT SINGLE VALUE ON SCREEN
270 REM  2290 REM PRINT DISPLAY ARRAY
280 REM  2460 REM CLEAR MASTER ARRAY
290 REM  2520 REM DISPLAY PATH MAP
300 REM  2850 REM LINEAR TRANSFORMATION
310 REM  3220 REM ADD INPUT TO MASTER
320 REM  3270 REM EROSION ROUTINE
330 REM  3280 REM ELIMINATES EDGE PIXELS
340 REM  3920 REM MEAN AND VARIANCE OVER A SUBIMAGE OF F2
350 REM  4200 REM CAPTIONS
360 REM  4280 REM SERVICE REQUEST (SRQ) ROUTINE
370 REM  4320 REM APPEND ROUTINE
380 DELETE 110,380
400 IMAGE F////////40A,100(5(" B"))
410 SET DEGREES
420 ON SRQ THEN 4290
430 DELETE F1,F2,F3,F4,G1,G2,G3,G4,B$,C$,I$,W$
440 I=MEMORY
450 DIM F1(32,32),F2(32,32),F3(32,32),F4(32,32),B$(60),C$(60),I$(100)
460 DIM G1(3),G2(3),G3(3),G4(3)
480 F1=0
490 F2=0
500 F3=0
510 F4=0
520 G1=256
530 G2=256
540 G3=256
550 G4=256
560 G1(1)=1
570 G2(1)=1
580 G3(1)=1
590 G2(1)=1
600 I=MEMORY
610 I=RND(-1)
620 B$=" "
630 C$=" "
640 FIND @2:1
650 Q=1
660 W0=0
670 Z0=0
680 PRINT "6-SYMBOL ID FOR THIS RUN: ";
690 INPUT T$
700 T$=T$&"       "
710 T$=SEG(T$,1,6)
720 T$=T$&"."
730 RETURN
```

```
750 PRINT "L        USER KEY INDEX:IIINPUT      OUTPUT"
760 PRINT " 1).....INITIALIZEII         F1-4"
770 PRINT " 2).....INPUT FIGURE TO DISPLAY ARRAYI            F2"
780 PRINT " 3).....LIST/EDIT FIGURE"
790 PRINT " 4).....ADD INPUT ARRAY TO MASTER ARRAYIF1,F2    F1=F1+F2"
800 PRINT " 5).....CLEAR MASTER ARRAYI1         F1"
810 PRINT " 6).....RECALL MASTER ARRAY.............F1IF1      F2=F1"
820 PRINT " 7).....RECALL DISPLAY/INPUT ARRAY......F2IF2      F2"
830 PRINT " 8).....RECALL OUTPUT ARRAY.............F3IF3      F2=F3"
840 PRINT " 9).....RECALL OUTPUT ARRAY.............F4IF4      F2=F4"
850 PRINT "10).....PRINT THIS INDEX"
860 PRINT "11).....COMPUTE GRADIENT OF DISPLAY ARRAYIF2       F3,F4"
870 PRINT "12).....COMPUTE LINEAR TRANSFORMATIONIF2           F2,F4"
880 PRINT "13).....COMPUTE EROSION OF DISPLAY ARRAYIF2        F2"
890 PRINT "15).....OUTPUT DISPLAY ARRAY TO PRINTERIF2         PRINTER"
900 PRINT "16).....RECALL PATH MAPIITAPE      SCREEN"
910 PRINT "17).....DISPLAY ARRAY DENSITYIIF2           SCREEN"
920 PRINT "18).....INPUT IMAGE SEGMENT FROM TAPEITAPE         F2"
930 PRINT "19).....MEAN AND VARIANCE OF SUBIMAGEIF2     SCREEN"
940 RETURN
1030 DELETE H,H0,H2,H3,H4,H7
1040 DIM H(3),H0(3,3),H2(3)
1060 F3=-1
1070 F4=-1
1080 G3=G2
1090 G4=G2
1100 G4(1)=0.25
1110 G3(1)=1
1120 PAGE
1130 PRINT "GRADIENT ANALYSIS:"
1140 PRINT "ENTER WINDOW SIZE: ";
1150 INPUT A
1160 A=2*INT(A/2)+1
1170 IF NOT(A=3 OR A=5) THEN 1120
1180 I$=STR(A)
1190 A$="COMPUTED GRADIENTS OF DISPLAY WITH WINDOW SIZE:"&I$
1200 GOSUB 4210
1210 GOSUB 1950
1220 H7=0,1
1230 H0=0
1240 H4=INT(A/2)
1250 H2=0
1260 IF A=5 THEN 1310
1270 H0(1,1)=1/9
1280 H0(2,2)=1/6
1290 H0(3,3)=1/6
1300 GO TO 1340
1310 H0(1,1)=1/25
1320 H0(2,2)=1/50
1330 H0(3,3)=1/50
1340 FOR H8=1 TO 16
1350 IF F2(H8,16)=>0 THEN 1370
1360 NEXT H8
1370 FOR I=33-H4-H8 TO H8+H4 STEP -1
1380 FOR J=H8+H4 TO 33-H4-H8
1390 IF A=5 THEN 1460
1400 H2(2)=-F2(J-1,I-1)-F2(J-1,I+1)-F2(J-1,I)+F2(J+1,I-1)+F2(J+1,I+1)
1410 H2(2)=(H2(2)+F2(J+1,I))*3/4
1420 H2(3)=-F2(J-1,I-1)+F2(J-1,I+1)-F2(J+1,I-1)+F2(J+1,I+1)
1430 H2(3)=H2(3)+F2(J,I+1)-F2(J,I-1)
1440 GO TO 1540
1460 FOR K=-H4 TO H4
1470 FOR L=-H4 TO H4
1480 H3=F2(J+L,I+K)
```

```
1490 H2(1)=H2(1)+H3
1500 H2(2)=H2(2)+H3*L*3/4
1510 H2(3)=H2(3)+H3*K
1520 NEXT L
1530 NEXT K
1540 H=H0 MPY H2
1550 F3(J,I)=0
1560 F4(J,I)=0
1580 IF H(2)=0 AND H(3)=0 THEN 1850
1590 H6=180+90*SGN(H(3))
1600 IF H(2)=0 THEN 1700
1610 H6=ATN(H(3)/H(2))
1620 IF H(2)<0 AND H(3)<0 THEN 1700
1630 IF NOT(H(2)<0 AND H(3)>0) THEN 1660
1640 H6=H6+360
1650 GO TO 1700
1660 IF NOT(H(2)>0) THEN 1690
1670 H6=H6+180
1680 GO TO 1700
1690 H6=90+90*SGN(H(2))
1700 H5=SQR(H(2)^2+H(3)^2)
1710 IF H5>1.0E-9 THEN 1730
1720 H5=0
1730 F3(J,I)=H5
1740 F4(J,I)=H6
1750 IF H5=0 THEN 1850
1770 MOVE J+0.5,I+0.5
1780 ROTATE H6
1790 RMOVE 0,0.1*(0.5-RND(1))
1800 RDRAW H5*H7,0
1810 RDRAW -0.05,-0.05
1820 RDRAW 0.05,0.05
1830 RDRAW -0.05,0.05
1840 ROTATE 0
1850 NEXT J
1860 NEXT I
1870 B$="GRADIENT MAGNITUDES"
1880 C$="GRADIENT ANGLES"
1890 DELETE A,H,H0,H2,H3,H4,H5,H6,H7,H8
1900 I=MEMORY
1910 MOVE 25,33.7
1920 PRINT "GGDONE!GG"
1930 RETURN
1950 PAGE
1960 VIEWPORT 0,130,0,100
1970 WINDOW -1,33,-1,34
1980 MOVE 0.8,0.7
1990 DRAW 0.8,33
2000 FOR I=1 TO 33
2010 MOVE I,0.7
2020 DRAW I,33
2030 MOVE -1,I
2040 DRAW 33,I
2050 NEXT I
2060 MOVE 16.5,16.5
2070 RDRAW 0,0
2080 MOVE -1,33.7
2090 PRINT A$
2100 FOR I=32 TO 1 STEP -1
2110 MOVE -1,I
2120 PRINT "";G2(3)-16+I
2130 NEXT I
2140 FOR I=1 TO 32 STEP 2
2150 MOVE I-0.6,-0.3
```

```
2160 PRINT G2(2)-16+I;
2170 NEXT I
2180 RETURN
2200 IF F9<0 THEN 2280
2210 I$=STR(INT(F9+0.5))
2220 I$=REP("",1,1)
2230 IF F9<99.499 THEN 2260
2240 J$=CHR(INT((F9+0.5)/10)+55)
2250 I$=REP(J$,1,2)
2260 MOVE I+0.1,J
2270 PRINT USING "2A":I$
2280 RETURN
2300 GOSUB 4210
2310 GOSUB 1950
2320 FOR J=32 TO 1 STEP -1
2330 FOR I=1 TO 32
2340 F=F2(I,J)*G2(1)
2350 IF F<0 THEN 2430
2360 I$=STR(INT(F+0.5))
2370 I$=REP("",1,1)
2380 IF F<99.499 THEN 2410
2390 J$=CHR(INT((F+0.5)/10)+55)
2400 I$=REP(J$,1,2)
2410 MOVE I+0.1,J
2420 PRINT USING "2A":I$
2430 NEXT I
2440 NEXT J
2450 RETURN
2470 F1=0
2480 A$="CLEARED MASTER ARRAY: F1=0"
2490 GOSUB 4210
2500 PRINT USING 400:A$
2510 RETURN
2530 CLOSE @2:
2540 FIND @2:1
2550 DIM Q$(140)
2560 Q$=""
2570 PAGE
2580 PRINT "PATH MAP:"
2590 PRINT "DISPLAY ARRAY AT:    (";G2(2);",";G2(3);")"
2600 Q$=A$
2610 IF LEN(A$)<58 THEN 2630
2620 Q$=REP("           ",58,0)
2630 PRINT "DISPLAY ARRAY: ";Q$;""
2640 INPUT @2,6:Q0
2650 IF NOT(Q0=4) THEN 2750
2660 READ @2:Q$
2670 IF LEN(Q$)<69 THEN 2730
2680 FOR I=68 TO 1 STEP -1
2690 I$=SEG(Q$,I,1)
2700 IF I$=" " THEN 2720
2710 NEXT I
2720 Q$=REP("   ",I,0)
2730 PRINT Q$
2740 GO TO 2640
2750 PRINT "ENTER REMARKS:"
2760 INPUT Q$
2770 IF LEN(Q$)=0 THEN 2830
2780 I$=STR(Q)
2790 Q=Q+1
2800 I$=I$&") "
2810 I$=I$&Q$
2820 WRITE @2:I$
2830 DELETE Q$
```

```
2840 RETURN
2860 DELETE T
2870 C$=A$
2880 PAGE
2890 PRINT "GENERAL TRANSFORMATION:"
2900 PRINT "ENTER WINDOW SIZE: ";
2910 INPUT T0
2920 T1=INT(T0/2)
2930 T0=2*T1+1
2940 DIM T(T0,T0)
2950 I$=STR(T0)
2960 A$="LINEAR TRANSFORMATION WITH WINDOW"&I$
2970 GOSUB 4210
2980 PRINT "ENTER (";T0;"x";T0;") TRANSFORMATION MATRIX IN ROW-MAJOR";
2990 PRINT " ORDER:"
3000 INPUT T
3010 GOSUB 1950
3020 F4=F2
3030 F2=-1
3040 G4=G2
3050 FOR T2=1 TO 15
3060 IF F4(T2,16)=>0 THEN 3080
3070 NEXT T2
3080 FOR J=33-T2-T1 TO T1+T2 STEP -1
3090 FOR I=T1+T2 TO 33-T2-T1
3100 F9=0
3110 FOR L=1 TO T0
3120 FOR M=1 TO T0
3130 F9=F9+T(L,M)*F4(I-T1+M-1,J+T1-L+1)
3140 NEXT M
3150 NEXT L
3160 F2(I,J)=F9
3170 GOSUB 2200
3180 NEXT I
3190 NEXT J
3200 DELETE T,T0,T1,T2
3210 RETURN
3230 F1=F1+F2
3240 A$="ADDED INPUT TO MASTER: F1=F1+F2"
3250 GOSUB 4210
3260 RETURN
3290 DELETE E,E0,E1,E2,E3,E9
3300 DIM E(32),E9(32)
3310 I=MEMORY
3320 PAGE
3330 PRINT "EROSION ROUTINE"
3340 PRINT "ENTER EROSION BASIS: ";
3350 INPUT E0
3360 PRINT "ENTER TOLERENCE: ";
3370 INPUT E1
3380 I$=STR(E0)
3390 A$="EROSION WITH BASIS OF"&I$
3400 I$=STR(E1)
3410 A$=A$&" AND TOLERENCE OF"
3420 A$=A$&I$
3430 GOSUB 4210
3440 GOSUB 1950
3450 FOR E2=1 TO 16
3460 IF F2(E2,16)=>0 THEN 3480
3470 NEXT E2
3480 FOR K=1 TO 32
3490 E(K)=F2(K,33-E2)
3500 NEXT K
3510 FOR J=32-E2 TO 1+E2 STEP -1
```

```
3520 FOR K=1 TO 32
3530 E9(K)=F2(K,J)
3540 NEXT K
3550 FOR I=E2+1 TO 32-E2
3560 IF F2(I,J)=0 THEN 3760
3570 E4=0
3580 IF E(I-1)>E1 THEN 3600
3590 E4=E4+1
3600 IF E(I)>E1 THEN 3620
3610 E4=E4+1
3620 IF E(I+1)>E1 THEN 3640
3630 E4=E4+1
3640 IF E9(I-1)>E1 THEN 3660
3650 E4=E4+1
3660 IF F2(I+1,J)>E1 THEN 3680
3670 E4=E4+1
3680 IF F2(I-1,J-1)>E1 THEN 3700
3690 E4=E4+1
3700 IF F2(I,J-1)>E1 THEN 3720
3710 E4=E4+1
3720 IF F2(I+1,J-1)>E1 THEN 3740
3730 E4=E4+1
3740 IF E4<E0 THEN 3760
3750 F2(I,J)=0
3760 F9=F2(I,J)
3770 GOSUB 2200
3780 NEXT I
3790 E=E9
3800 NEXT J
3810 FOR J=1 TO E2
3820 FOR I=1 TO 32
3830 F2(I,J)=-1
3840 F2(I,33-J)=-1
3850 F2(J,I)=-1
3860 F2(33-J,I)=-1
3870 NEXT I
3880 NEXT J
3890 DELETE E,E1,E2,E3,E4,E9
3900 I=MEMORY
3910 RETURN
3930 PRINT 'LJMEAN AND VARIANCE OVER A SUBIMAGE OF F2'
3940 DELETE Z9,Z8,Y5
3950 DIM Z9(4),Z8(3),Y5(6)
3960 PRINT 'JJXMIN,XMAX,YMIN,YMAX :';
3970 INPUT Z9
3980 Z8=0
3990 Z8(3)=(Z9(4)-Z9(3)+1)*(Z9(2)-Z9(1)+1)
4000 FOR Z6=Z9(1)-G2(2)+16 TO Z9(2)-G2(2)+16
4010 FOR Z7=Z9(3)-G2(3)+16 TO Z9(4)-G2(3)+16
4020 Z8(1)=Z8(1)+F2(Z6,Z7)
4030 Z8(2)=Z8(2)+F2(Z6,Z7)^2
4040 NEXT Z7
4050 NEXT Z6
4060 Z8(1)=Z8(1)/Z8(3)
4070 Z8(2)=SQR(Z8(2)/Z8(3)-Z8(1)^2)
4080 PRINT '_MEAN;VARIANCE;NUM. PIXELS';
4090 PRINT Z8
4100 Y5=0
4110 FOR Z6=Z9(1)-G2(2)+16 TO Z9(2)-G2(2)+16
4120 FOR Z7=Z9(3)-G2(3)+16 TO Z9(4)-G2(3)+16
4130 Z5=INT((F2(Z6,Z7)-Z8(1))/Z8(2) MAX -3)+4 MIN 6
4140 Y5(Z5)=Y5(Z5)+1
4150 NEXT Z7
4160 NEXT Z6
```

```
4170 PRINT USING "2/20X""DISTRIBUTION BY ST. DEVS.""2/6(10D)":Y5
4180 PRINT USING "/6(6D.3D)":Y5/Z8(3)
4190 RETURN
4210 I$=STR(Q)
4220 I$=T$&I$
4230 I$=I$&") "
4240 A$=I$&A$
4250 WRITE @2:A$
4260 Q=Q+1
4270 RETURN
4290 POLL I9,I9;2
4300 INPUT @2,30:I8
4310 RETURN
4330 W=VAL(W$)
4340 IF W=W0 THEN 4400
4350 DELETE 10001,65535
4360 I=MEMORY
4370 FIND W
4380 CALL "BAPPEN",10000
4390 W0=W
4400 GO TO 10000
10000 REM APPEND HERE!!!

FILE #6

10000 REM APPEND HERE!!!
10010 REM TAPE IMAGE INPUT
10020 DELETE X$,Y$,Z$
10030 DIM Y$(32),Z$(360)
10040 PRINT "LTAPE IMAGE INPUT PROGRAM:"
10050 PRINT "ENTER IMAGE NUMBER: ";
10060 INPUT Z
10070 PRINT "ENTER CENTER OF SEGMENT: ";
10080 INPUT G2(2),G2(3)
10090 PRINT "INSERT DATA TAPE INTO 4052 AND PRESS [RETURN].";
10100 INPUT I$
10110 REM IF TAPE HEADER HAS ALLREADY BEEN READ THEN SKIP TO INPUT
10120 IF Z=Z0 THEN 10250
10130 Z1=2
10140 REM READ FIRST HEADER FOR IMAGE MATCH
10150 FIND 1
10160 INPUT @33:Z2,Z3,Z4,Z5,Z6,Z7,Z$
10170 IF Z=Z5 THEN 10250
10180 Z1=Z2+1
10190 REM READ SECOND HEADER FOR IMAGE MATCH
10200 FIND Z2
10210 INPUT @33:Z2,Z3,Z4,Z5,Z6,Z7,Z$
10220 IF Z=Z5 THEN 10250
10230 PRINT "_GGIMAGE #";Z;" NOT FOUND ON TAPE #";Z6
10240 GO TO 10050
10250 I$=STR(Z)
10260 A$="IMAGE #"&I$
10270 GOSUB 4210
10280 Z0=Z
10290 DIM X$(Z4)
10300 GOSUB 1950
10310 X1=INT((G2(2)-15)/32)
10320 FIND X1+Z1
10330 X2=G2(2)-15-X1*32
10340 IF X2=1 THEN 10380
10350 FOR K=1 TO X2
10360 INPUT @33:X$
10370 NEXT K
10380 FOR I=1 TO 32
```

```
10390 IF TYP(0)=1 THEN 10560
10400 INPUT @33:X$
10410 Y$=SEG(X$,G2(3)-16,32)
10420 FOR J=32 TO 1 STEP -1
10430 I$=SEG(Y$,J,1)
10440 F9=ASC(I$)
10450 IF NOT(F9=127) THEN 10470
10460 F9=13
10470 IF NOT(F9=126) THEN 10490
10480 F9=19
10490 IF Z3 THEN 10510
10500 F9=125-F9
10510 F2(I,J)=F9
10520 GOSUB 2200
10530 NEXT J
10540 NEXT I
10550 RETURN
10560 FIND X1+Z1+1
10570 GO TO 10400

FILE #7

10000 REM APPEND HERE!!!
10010 REM DENSITY DISPLAY
10020 DIM I0(5),I1(5),J1(5)
10030 RESTORE 10050
10040 READ I0
10050 DATA 0.1,0.3,0.5,0.7,0.9
10060 V0=0
10070 V1=1
10080 V2=2
10090 V3=3
10100 V4=4
10110 V5=5
10120 PRINT "IMAGE DENSITY DISPLAY:"
10130 PRINT "ENTER IMAGE MAXIMUM (0 DEFAULT): ";
10140 INPUT M
10150 IF M>0 THEN 10230
10160 REM FIND MAXIMUM OF ARRAY
10170 M=0
10180 FOR I=V1 TO 32
10190 FOR J=V1 TO 32
10200 M=M MAX F2(I,J)
10210 NEXT J
10220 NEXT I
10230 M=M/9
10240 F2=F2/M
10250 I1=I0
10260 J1=32+I0
10270 REM SET UP DISPLAY
10280 WINDOW -2,34,-2,34
10290 VIEWPORT 0,130,0,100
10300 PAGE
10310 MOVE 0.9,33.1
10320 DRAW 0.9,0.9
10330 DRAW 33.1,0.9
10340 DRAW 33.1,33.1
10350 DRAW 0.9,33.1
10360 MOVE 1,33.2
10370 PRINT A$
10380 GOSUB 2100
10390 FOR J=32 TO V1 STEP -1
10400 FOR I=V1 TO 32
10410 I1=I1+1
```

```
10420 V9=F2(I,J) MIN 9
10430 GO TO V9 OF 10930,10870,10810,10750,10690,10630,10570,10510,10450
10440 GO TO 10950
10450 MOVE I1(V2),J1(V2)
10460 RDRAW V0,V0
10470 MOVE I1(V5),J1(V2)
10480 RDRAW V0,V0
10490 MOVE I1(V4),J1(V4)
10500 RDRAW V0,V0
10510 MOVE I1(V1),J1(V3)
10520 RDRAW V0,V0
10530 MOVE I1(V3),J1(V2)
10540 RDRAW V0,V0
10550 MOVE I1(V3),J1(V5)
10560 RDRAW V0,V0
10570 MOVE I1(V2),J1(V4)
10580 RDRAW V0,V0
10590 MOVE I1(V4),J1(V1)
10600 RDRAW V0,V0
10610 MOVE I1(V5),J1(V4)
10620 RDRAW V0,V0
10630 MOVE I1(V1),J1(V5)
10640 RDRAW V0,V0
10650 MOVE I1(V2),J1(V1)
10660 RDRAW V0,V0
10670 MOVE I1(V4),J1(V3)
10680 RDRAW V0,V0
10690 MOVE I1(V1),J1(V1)
10700 RDRAW V0,V0
10710 MOVE I1(V3),J1(V4)
10720 RDRAW V0,V0
10730 MOVE I1(V5),J1(V1)
10740 RDRAW V0,V0
10750 MOVE I1(V2),J1(V3)
10760 RDRAW V0,V0
10770 MOVE I1(V4),J1(V2)
10780 RDRAW V0,V0
10790 MOVE I1(V5),J1(V5)
10800 RDRAW V0,V0
10810 MOVE I1(V1),J1(V4)
10820 RDRAW V0,V0
10830 MOVE I1(V3),J1(V1)
10840 RDRAW V0,V0
10850 MOVE I1(V4),J1(V5)
10860 RDRAW V0,V0
10870 MOVE I1(V1),J1(V2)
10880 RDRAW V0,V0
10890 MOVE I1(V2),J1(V5)
10900 RDRAW V0,V0
10910 MOVE I1(V5),J1(V3)
10920 RDRAW V0,V0
10930 MOVE I1(V3),J1(V3)
10940 RDRAW V0,V0
10950 NEXT I
10960 I1=I1-32
10970 J1=J1-1
10980 NEXT J
10990 F2=F2*M
11000 I1=I1+25
11010 J1=J1+26
11020 VIEWPORT 30,130,0,100
11030 RETURN
11040 FOR I=9 TO 0 STEP -1
11050 IF I<1 THEN 11090
```

```
11060 J1=J1-2
11070 GO TO I OF 10930,10870,10810,10750,10690,10630,10570,10510,10450
11080 NEXT I
11090 DELETE I0,I1,J1
11100 RETURN

FILE #8

10000 REM APPEND HERE!!!
10010 REM FUNCTION VALUES TO PRINTER
10020 PAGE
10030 PRINT "OUTPUT DISPLAY ARRAY TO PRINTER:"
10040 PRINT "SET PRINTER TO TOP OF FORM"
10050 PRINT "PRESS [RETURN] WHEN READY";
10060 INPUT I$
10070 FOR J=32 TO 1 STEP -1
10080 PRINT @51: USING "3DAS":G2(3)-16+J,":"
10090 FOR I=1 TO 32
10100 IF F2(I,J)<0 OR F2(I,J)>9999.499 THEN 10130
10110 PRINT @51: USING "4DS":F2(I,J)
10120 GO TO 10140
10130 PRINT @51: USING "4AS":"   *"
10140 NEXT I
10150 PRINT @51:"J";
10160 IF J=1 THEN 10180
10170 PRINT @51:"    !"
10180 NEXT J
10190 PRINT @51:A$;
10200 FOR I=1 TO 132-LEN(A$)
10210 PRINT @51:"=";
10220 NEXT I
10230 PRINT @51:
10240 PRINT @51: USING "5XS":
10250 FOR I=G2(2)-16+1 TO G2(2)+16
10260 PRINT @51: USING "3DXS":I
10270 NEXT I
10280 PRINT @51:
10290 RETURN
```

The method and apparatus of the invention are particularly suitable for detecting agricultural contraband in baggage or parcels as described above. Another important application of the invention is in the field of medical X-ray imagery. Objects of circular cross section contained or embedded in human or animal bodies can be selectively enhanced using the invention and information obtained from the image shadow shape and shape of the cross section. In this way three-dimensional shape information of organs and objects in human or animal bodies can be obtained from a single X-ray exposure. In this case the threshold level t should be adjusted to be comparable to the amount of contrast present in the image.

The method and apparatus described above may also be used for industrial inspection of materials to distinguish voids from cracks. In this use, voids of circular cross section are selectively enhanced and thereby detected. Again the threshold level t is adjusted to be comparable to the amount of contrast present in the image.

EXAMPLE

The invention is further demonstrated by the following illustrative example wherein agricultural contraband contained in passenger baggage is detected. This is by way of illustration and not limitation.

A leatherette carry-on suitcase was filled with items commonly carried by travellers, i.e. clothing, shoes, coat hangers, glasses, electric razors, sunglasses, toilet kit, a souvenir wine glass and a jar of baby food. To this was added a number of items characteristic of agricultural contraband. These items included grapes, candy, three citrus fruits, a papaya, a banana and a sausage. Also added was a short round cylinder or similar size and density as the citrus fruits, to simulate a cold cream jar, packed end-on.

Figure 4:
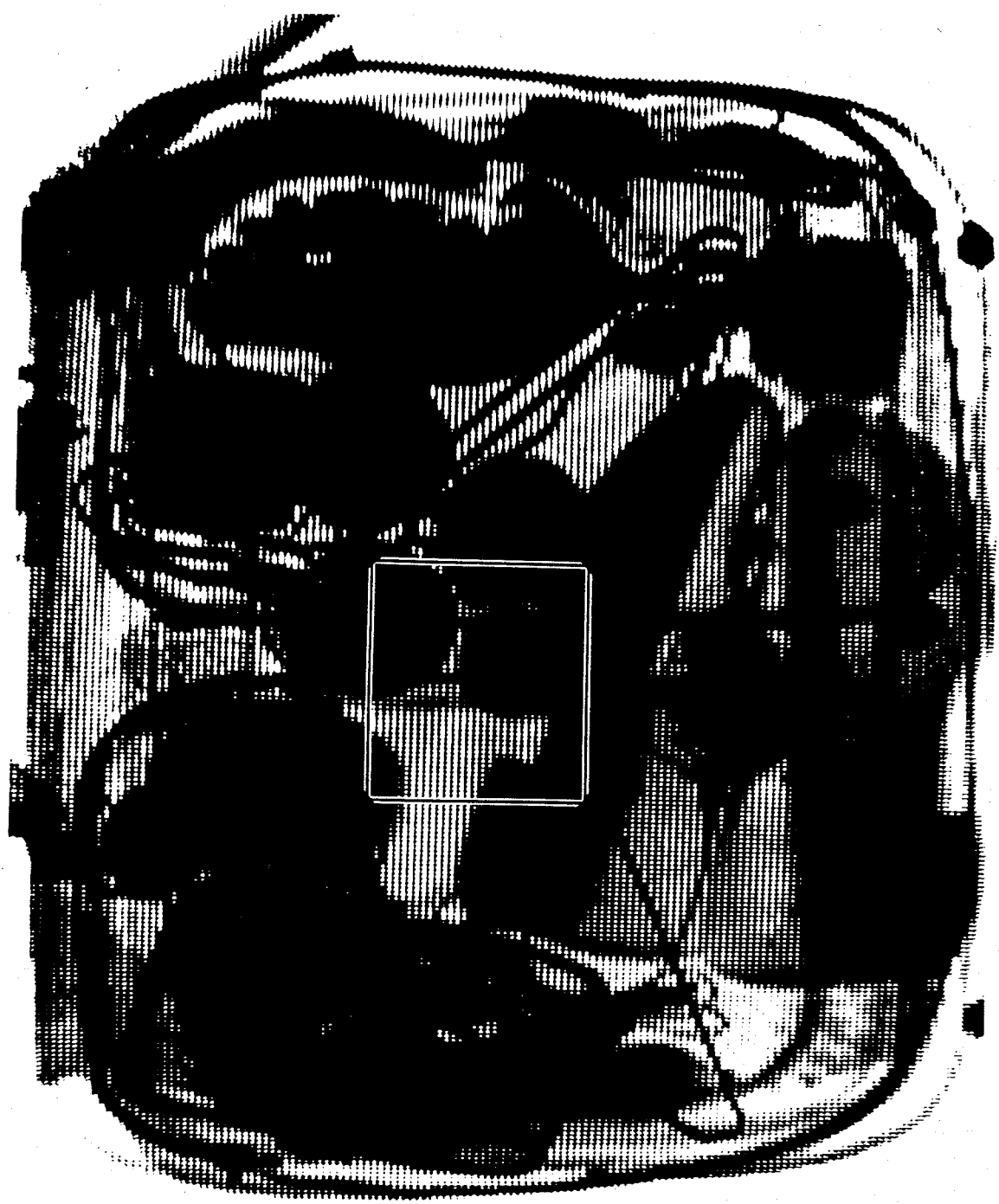
FIG. 4 is a photograph of the image of a piece of baggage containing agricultural contraband obtained in the manner of FIG. 1.

The suitcase was passed through a commercial X-ray imaging system (Astrophysics Line Scan 1 (Patent Application Ser. No. 185,561)) in the manner depicted in FIG 1. Referring to FIG. 3, the image from detector 10 was passed directly to ALU 15 (for gamma correction and black/white reversal), display buffer 14, DAC 16 and monitor 20, in that order. No array processors or other frame buffers were used. A photograph of the image of the objects in the suitcase obtained by this commercial system, i.e., without treatment with the invention, is shown in FIG. 4. At the same time that the data was sent to the display buffer, it was also captured in digital form on magnetic storage device (tape) 22.

The magnetic tape was processed by a Tektronix 4052 computer and treated by the computer code given above. After selecting a 58×58 pixel sub-area of FIG. 4 delineated by the curser box, this sub-area was divided into 4 overlapping sub-areas of 32×32 pixels each and each 32×32 sub-area was brought into computer array F2 using User Key 18 and file 6; displayed on the screen of the Tektronix 4052 using User Key 17 and file 7; a copy made by use of a Tektronix 4631 hardcopy device and the copy saved.

Figure 5:
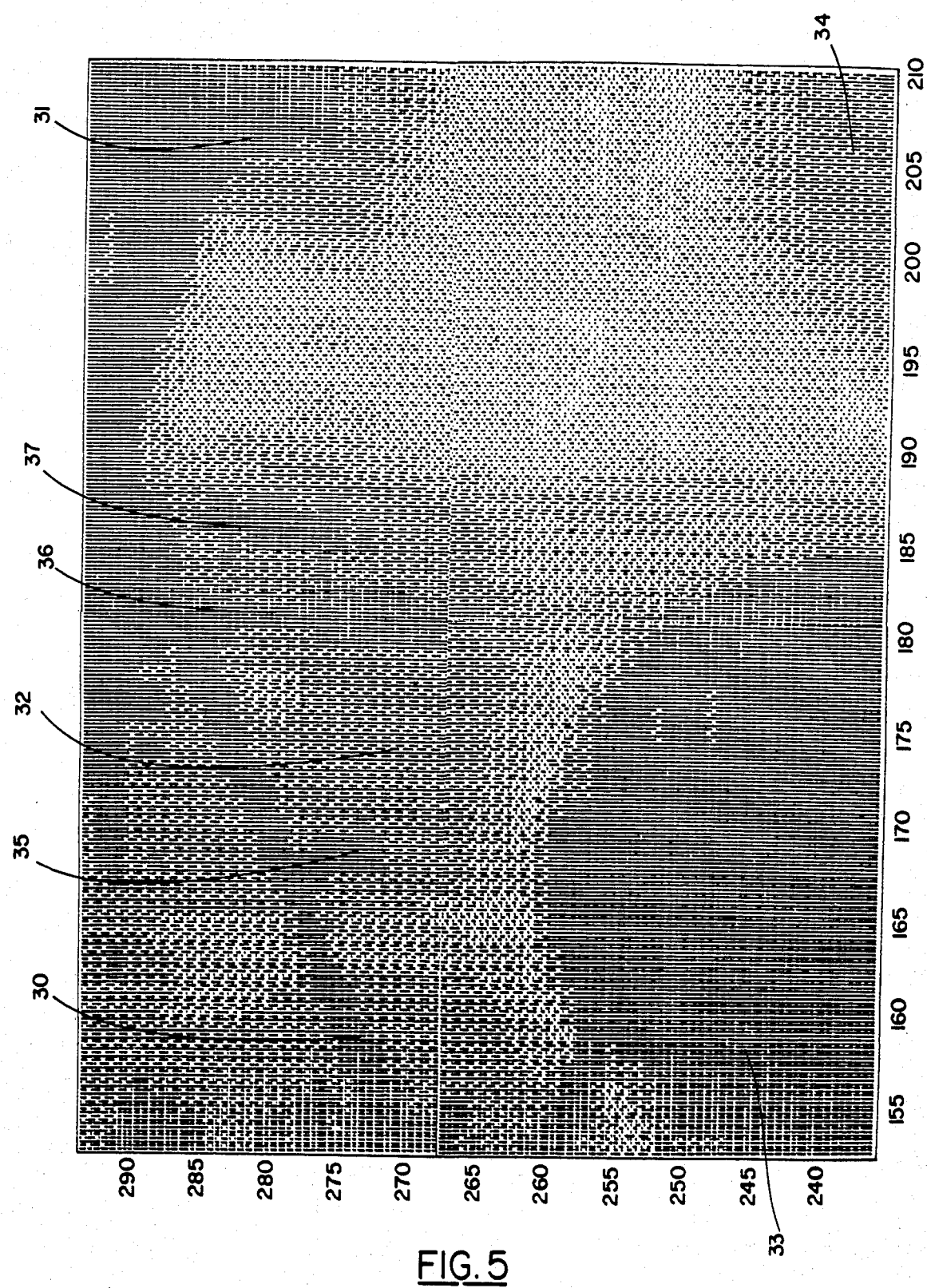
FIG. 5 is a computer display of a sub-area of FIG. 4.
Figure 6:
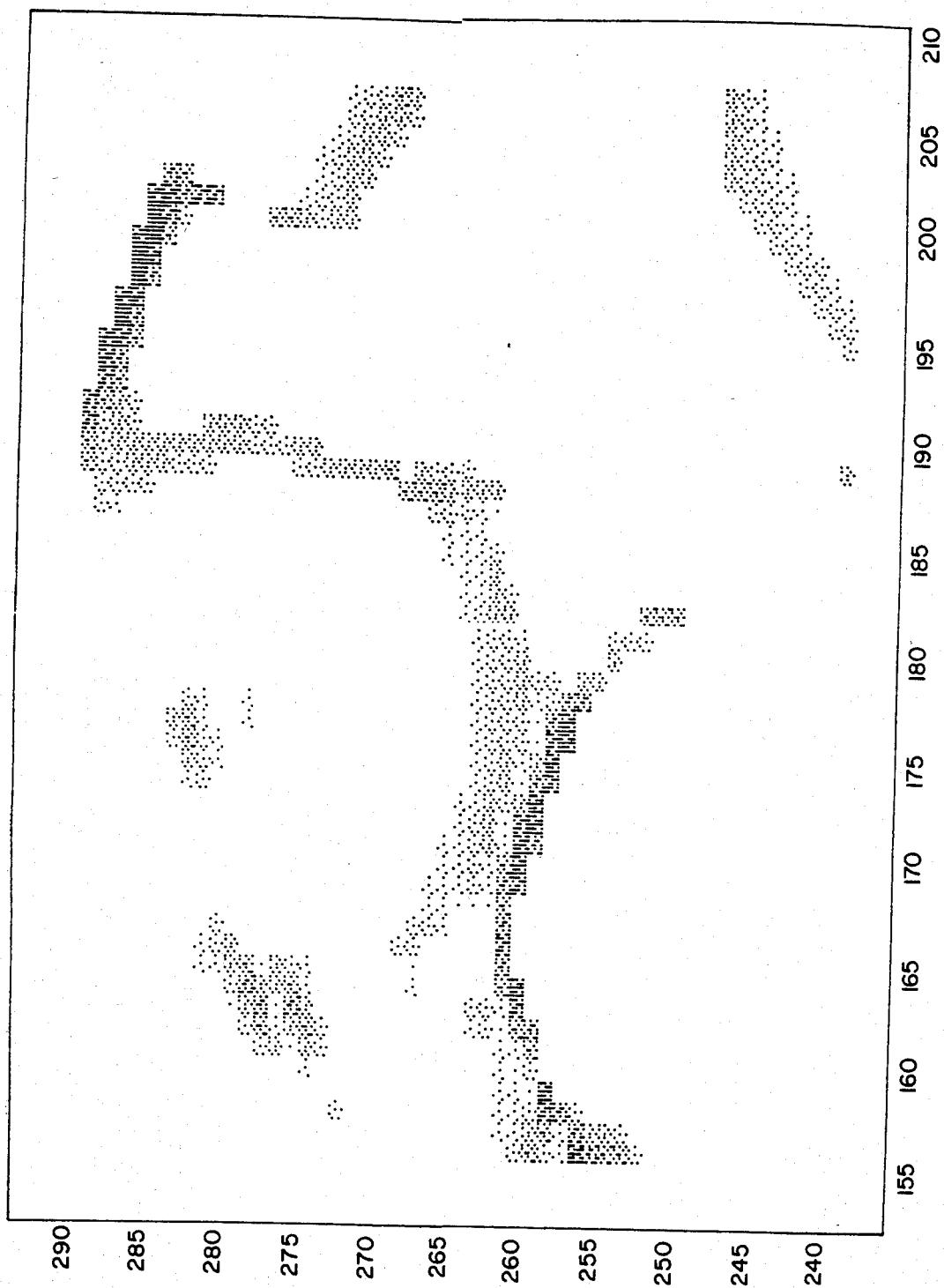
FIG. 6 is a computer display of the region of FIG. 5 after applying the method of the invention.

The gradient g of F2 was computed as described in file 4 by use of User Key 11; the resulting array F3 was moved to F2 by use of the statement F2=F3; F2 was eroded two times by using User Key 13 twice; using each time an erosion basis (m) of 3 and a tolerance (t) of 3 (out of 127 maximum). The resulting image $h_2$ in F2 was then displayed and copied and saved as above. After repeating the above process for each of the four quadrants of the 58×58 sub-area, the quadrants of the original image were assembled to create FIG. 5 and the quadrants of the eroded edge image $h_2$ to create FIG. 6. Because of inherent limitations in the display capacity of the Tektronix 4052 computer, no attempt was made to add $h_2$ back to the original image. FIG. 5 shows the partial image of a coat hanger (30), shoe sole and heel (31), tangerine (32), simulated cold cream jar placed end-on (33), papaya (34), and three verical suitcase seams (35,36,37). In the eroded gradient image what remained was the edge of the papaya, the tangerine (including the hole in the middle), a very thin outline of part of the step edge of the cold cream jar and shoe sole and heel and a small section of the coathanger. Thus the method selectively enhanced the two pieces of fruit and completely or almost completely eliminated everything else in the image. Use of the image of FIG. 6 or a thresholded version thereof to enhance FIG. 5 would cause just the contraband fruit objects to be highlighted.

Having thus described my invention, I claim:

1. In a radiant energy imaging system, a method for distinguishing objects having circular cross section from objects having rectangular cross section, such objects being contained in a material having a different density-absorption coefficient product than the objects, comprising:
   (a) directing a beam of radiant energy through the objects;
   (b) measuring transmitted intensity of the radition while maintaining spatial resolution;
   (c) calculating a spatial gradient image of the transmitted intensity;
   (d) eroding the gradient image one or more times to preferentially remove edges of images of objects having rectangular cross section relative to edges of images of objects having circular cross section, said objects being contained in a material having a different density-absorption coefficient product than said objects; and
   (e) presenting the image of step (d).

2. The method of claim 1 wherein step (b) furher comprises transforming the measured transmitted intensity with a point transform selected from the group consisting of full gamma correction, partial gamma correction, black/white reversal, and thresholding.

3. The method of claim 1 wherein step (d) further comprises multiplying the eroded gradient image by a constant.

4. The method of claim 3 wherein said multiplication comprises a false color transform.

5. The method of claim 1 wherein said step (d) further comprises thresholding the eroded gradient image.

6. The method of claim 1 further comprising adding the eroded gradient image of step (d) to the image of the spatially resolved transmitted intensity of step (b) prior to presenting the image.

7. The method of claim 6 wherein the eroded gradient image of step (d) is multiplied by a constant prior to being added to the image of step (b).

8. The method of claim 1 wherein said presenting of step (e) comprises visually displaying the image.

9. The method of claim 1 wherein said presenting of step (e) comprises integrating the eroded gradient image of step (d) and comparing the integrated value to a set value to activate an alarm.

10. The method of claim 1 wherein the objects having circular cross section are agricultural objects.

11. The method of claim 1 wherein the objects having circular cross section are voids.

12. In a radiant energy imaging system, a method for distinguishing objects having circular cross section from objects having rectangular cross section, such objects being contained in a material having a different density-absorption coefficient product than the objects, comprising:
   (a) directing a beam of radiant energy through the objects;
   (b) measuring transmitted intensity of the radiation while maintaining spatial resolution;
   (c) transforming the measured transmitted intensity of step (b) with a point transform selected from group consisting of full gamma correction, partial gamma correction, black/white reversal, and thresholding;
   (d) calculating the spatial gradient image of the transformed transmitted intensity;
   (e) eroding the gradient image one or more times to preferentially remove the edges of images of objects having rectangular cross section relative to the edges of images of objects having circular cross section, said objects being contained in a material having a different density-absorption coefficient product than said objects;
   (f) multiplying the eroded gradient image by a constant;
   (g) adding the eroded gradient image of step (f) to the image of the transformed spatially resolved transmitted intensity of step (c); and
   (h) visually displaying the image of step (g).

13. A radiant energy imaging apparatus for distinguishing objects having circular cross section from objects having rectangular cross section, such objects being contained in a material having a different density-absorption coefficient product than the objects, comprising:
   (a) a beam of radiant energy to irradiate the objects;
   (b) means for measuring transmitted intensity of the radiation after irradiation of the objects in step (a) while maintaining spatial resolution;
   (c) means for calculating a spatial gradient image of the transmitted intensity of step (b);
   (d) means for eroding the gradient image of step (c) one or more times to preferentially remove edges of images of objects having rectangular cross section relative to edges of images of objects having circular cross section; and
   (e) means for presenting the image of step (d).

14. The apparatus of claim 13 wherein said measuring means of step (b) further comprises means for transforming the measured transmitted intensity with a point transform selected from the group consisting of full gamma correction, partial gamma correction, black/white reversal, and thresholding.

15. The apparatus of claim 13 wherein said eroding means of step (d) further comprises means for multiplying the eroded gradient image by a constant.

16. The apparatus of claim 13 further comprising means for thresholding the eroded gradient image.

17. The apparatus of claim 13 further comprising means for adding the eroded gradient image of step (d) to the image of the spatially resolved transmitted intensity of step (b) prior to presenting the image.

18. The apparatus of claim 13 wherein said means for presenting of step (e) comprises visually displaying the image.

19. The apparatus of claim 13 wherein said means for presenting of step (e) comprises integrating the eroded gradient image of step (d) and comparing the integrated value to a set value to activate an alarm.

* * * * *